(12) United States Patent
Campbell

(10) Patent No.: X8271
(45) Date of Patent: Jun. 19, 1834

(54) SPINNING WOOL

(76) Inventor: Asa Campbell

United States Patent Patent No.: X8271

Asa Campbell, of Kingston Pensylvania.

Letters Patent.

The Schedule referred to in these Letters Patent and making part of the same, containing a description in the words of the said Asa Campbell himself, of his improvement in the Ma-chine for Spinning Wool. To all to whom these presents shall come. Be it known that I. Asa Campbell of Kingston in the County of Luzerne and State of Pennsylvania have invented a new and useful improvement in the Machine for Spinning Wool, and that the following is a full and exact description of the construction and operation of the said Machine as in=vented and improved by me. The bench may be as in the common old fashioned family wheel for spinning wool, A piece of timber two by six inches, six feet long supported upon legs of 18 inches or two feet in length, the bench A. 1. to lay in a horizontal direction; into each end of which is to be framed a perpendicular post A. 2. and A. 3. two by three inches and four feet in length, and a piece of timber of the same dimen=tions, except to be eight feet long projecting to the left, to be framed across the top of the two upright posts; at a suitable dis=tance say eighteen inches from the bottom of the right hand upright post, is to be inserted an axle (as the in common wheel) for the rim B. to turn upon, the rim to be three feet diameter around which rim is to be placed a cord 1. 1. to run over a sheeve, I. four inches in diameter upon an axle fastened in the top piece A. 4. two inches from the upper end of the left hand post A. 2. upon which axle is also a pendulum Pendulum C (so called) to be made of wood one by two inches at top, and one inch diameter round, at bottom; 4½ feet in length.- At the lower end of which and at a right angle from the same, projecting in front is a spindle D. which like that of the common spindle upon which wool is spun.– upon the last mentioned sheeve is another sheeve
J. one and a half inch in diameter upon which & around the whirr on
the spindle, runs a cord I.2. nine feet long; into the bottom of the two right
hand legs is fixed a treadle G. as in the common small wheel for spin=
=ing flax & may be 4½ ft long– at the left hand end of which is to be
fixed a small pully & block H..1. in which runs a cord I.3. of five
feet in length one end of which is fastened to the post A.2. at two
feet from the bottom of the same, at the other end of this cord is to
be another pully & block H.2. of the same size. in this Pulley runs
another cord I.4. one end of which is to be fastened to the top piece
(A.4) 2 feet from the right hand end of the same and to run from thence
through the pulley and over a sheeve K,1. of 3 inches diameter. running
upon an axle fixed in the top piece A.4. within three inches of the
left hand end of the same, thence to the pendulum (C) and made
fast at 15 inches from the bottom of the same. this cord will be eleven
feet long.– 12 inches from the bottom of the pendulum (C.) another
cord F is fastened, which is to run over a sheeve K.2. of three inches
diameter, on an axle fastened in the top piece (A.4.) within three
inches of the right hand end of the same. at the other end of which cord
is to be attached a weight of two pounds. which weight is to run in
a tube E, to stand perpendicular, and be attached to the right hand
end of the Machine; the last mentioned cord (F) to be nine feet long.
each of the above mentioned Cords may be of the size of the cord or
band used on the common wheel for spinning wool.– The improve=
ment which the Petitioner claims as his own, and for which he
now asks a Patent, is the principle of throwing the spindle out with
the foot upon the treadle by means of the spindle being attached
to a pendulum, to which is connected the different Cords & weight
calculated to bring the spindle back to the person using the Machine;
thereby making it conveniently worked by the person in a sitting
posture.–

Witnesses
A. E. Phillips
Philip Jackson

Asa Campbell

[illegible] [illegible]